United States Patent
Nguyen et al.

(10) Patent No.: US 9,100,104 B2
(45) Date of Patent: Aug. 4, 2015

(54) SYSTEMS AND METHODS FOR PHYSICAL SECURITY OF INFORMATION FLOWS OVER A POWER CABLE CONNECTION

(71) Applicant: The Boeing Company, Seal Beach, CA (US)

(72) Inventors: Nha Thanh Nguyen, Shoreline, WA (US); Timothy M. Mitchell, Seattle, WA (US); Anil Kumar, Sammamish, WA (US); Radhakrishna G. Sampigethaya, Snoqualmie, WA (US); Arun Ayyagari, Seattle, WA (US); Sudhakar S. Shetty, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 171 days.

(21) Appl. No.: 13/888,008

(22) Filed: May 6, 2013

(65) Prior Publication Data
US 2015/0023437 A1    Jan. 22, 2015

(51) Int. Cl.
*H04B 3/56*    (2006.01)
*H04B 3/54*    (2006.01)
(Continued)

(52) U.S. Cl.
CPC .. *H04B 3/56* (2013.01); *H04B 3/54* (2013.01); *H04B 3/542* (2013.01); *H04B 7/18506* (2013.01); *H04L 12/10* (2013.01);
(Continued)

(58) Field of Classification Search
CPC .... H04B 3/56; H04B 2203/4587; H04B 3/54; H04B 3/542; H04L 29/08; H04L 67/12
USPC ......................................................... 375/257
See application file for complete search history.

(56) References Cited

U.S. PATENT DOCUMENTS

| | | |
|---|---|---|
| 6,995,658 B2 | 2/2006 | Tustison et al. |
| 7,893,557 B2 | 2/2011 | Davis et al. |
| 2008/0217996 A1 | 9/2008 | Niss |
| 2012/0099627 A1 | 4/2012 | Mitchell et al. |
| 2013/0003756 A1 | 1/2013 | Mitchell et al. |
| 2014/0049099 A1 | 2/2014 | Sampigethaya et al. |

(Continued)

FOREIGN PATENT DOCUMENTS

| | | |
|---|---|---|
| EP | 2775629 A1 | 9/2014 |
| WO | 2014028135 A1 | 2/2014 |
| WO | 2014039197 A1 | 3/2014 |

OTHER PUBLICATIONS

Combined Search and Examination Report of Application No. GB1407287.0; Oct. 7, 2014; 7 pages.

*Primary Examiner* — Michael Neff
(74) *Attorney, Agent, or Firm* — Armstrong Teasdale LLP (57) ABSTRACT

An aircraft includes a first electrical connector configured to couple with a first power cable, a first data communication network and a first modem coupled to first electrical connector and first data communication network and is configured to transmit data received at first electrical connector through first power cable to first data communication network and to transmit data from first data communication network to first power cable through first electrical connector. The aircraft additionally includes a second electrical connector configured to couple with a second power cable, a second data communication network and a second modem coupled to second electrical connector and to second data communication network and is configured to transmit data received at second electrical connector through second power cable to second data communication network and to transmit data from second data communication network to second power cable through second electrical connector.

19 Claims, 5 Drawing Sheets

(51) Int. Cl.
*H04B 7/185* (2006.01)
*H04L 12/10* (2006.01)
*H04L 29/08* (2006.01)

(52) U.S. Cl.
CPC ....... *H04L 67/12* (2013.01); *H04B 2203/5445* (2013.01); *H04B 2203/5487* (2013.01)

(56) References Cited

U.S. PATENT DOCUMENTS

| | | |
|---|---|---|
| 2014/0074321 A1 | 3/2014 | Lee et al. |
| 2014/0112399 A1* | 4/2014 | Reuven .................. 375/258 |
| 2014/0236394 A1 | 8/2014 | Kumar et al. |
| 2014/0254693 A1 | 9/2014 | Mitchell et al. |

* cited by examiner

SYSTEMS AND METHODS FOR PHYSICAL SECURITY OF INFORMATION FLOWS OVER A POWER CABLE CONNECTION

BACKGROUND

The present disclosure relates generally to transmitting data, and more particularly to securely and efficiently transmitting data between an aircraft and a ground station.

At least some known aircraft include at least two separate power systems, each of which may receive electrical power from an external source through a separate power cable. More specifically, each power cable used to transmit electrical power from an external source is coupled to a dedicated electrical connector located on or inside the aircraft and to provide power to a corresponding electrical system of the aircraft.

Known aircraft include different sets of computing devices that relate to different information domains. For example, a first information domain may be military data and a second information domain may be civilian data. In another example, in some aircraft, the different information domains may include in-flight entertainment (IFE), airline information services (AIS), and/or an aircraft control domain (ACD). Accordingly, when transmitting data between computing devices internal and external to the aircraft (i.e., to and from a ground station), preventing data associated with one information domain from being received by computing devices associated with a different information domain facilitates efficient and secure data transmission. However, equipping existing aircraft with additional networking infrastructure to facilitate such separate data transmission can be time consuming, expensive, and operationally difficult.

BRIEF DESCRIPTION

In one aspect, an aircraft is provided. The aircraft includes a first electrical connector that is configured to couple with a first power cable. The aircraft additionally includes a first data communication network and a first modem that is coupled to the first electrical connector and to the first data communication network. The first modem is configured to transmit data received at the first electrical connector through the first power cable to the first data communication network and to transmit data from the first data communication network to the first power cable through the first electrical connector. The aircraft includes a second electrical connector that is configured to couple with a second power cable. The aircraft additionally includes a second data communication network and a second modem that is coupled to the second electrical connector and to the second data communication network. The second modem is configured to transmit data received at the second electrical connector through the second power cable to the second data communication network and to transmit data from the second data communication network to the second power cable through the second electrical connector.

In another aspect, a system for transmitting and receiving data between a ground station and an aircraft is provided. The system includes a first power cable, a ground station comprising a first ground station electrical connector that is coupled to the first power cable, a first ground station data communication network, and a first ground station modem that is coupled to the first ground station electrical connector and to the first ground station data communications network, wherein the first ground station modem is configured to transmit and receive data between the first ground station electrical connector and the first ground station data communication network. The system additionally includes an aircraft that includes a first aircraft electrical connector that is coupled to the first power cable, a first aircraft data communication network, and a first aircraft modem that is coupled to the first aircraft electrical connector and to the first aircraft data communication network. The first aircraft modem is configured to transmit and receive data between the first aircraft electrical connector and the first aircraft data communication network.

In another aspect, a method for transmitting and receiving data between an aircraft and a first data source and a second data source that are external to the aircraft is provided. The aircraft includes a first electrical connector that is coupled with a first power cable. The aircraft additionally includes a first data communication network, a first modem that is coupled to the first electrical connector and to the first data communication network, a second electrical connector that is coupled with a second power cable, a second data communication network, and a second modem that is coupled to the second electrical connector and to the second data communication network. The method includes receiving, by the first electrical connector, first data from the first data source via the first power cable and transmitting, by the first modem, the first data from the first electrical connector to the first data communication network. The method additionally includes receiving, by the second electrical connector, second data from the second data source via the second power cable and transmitting, by the second modem, the second data from the second electrical connector to the second data communication network.

DETAILED DESCRIPTION

Figure 1:
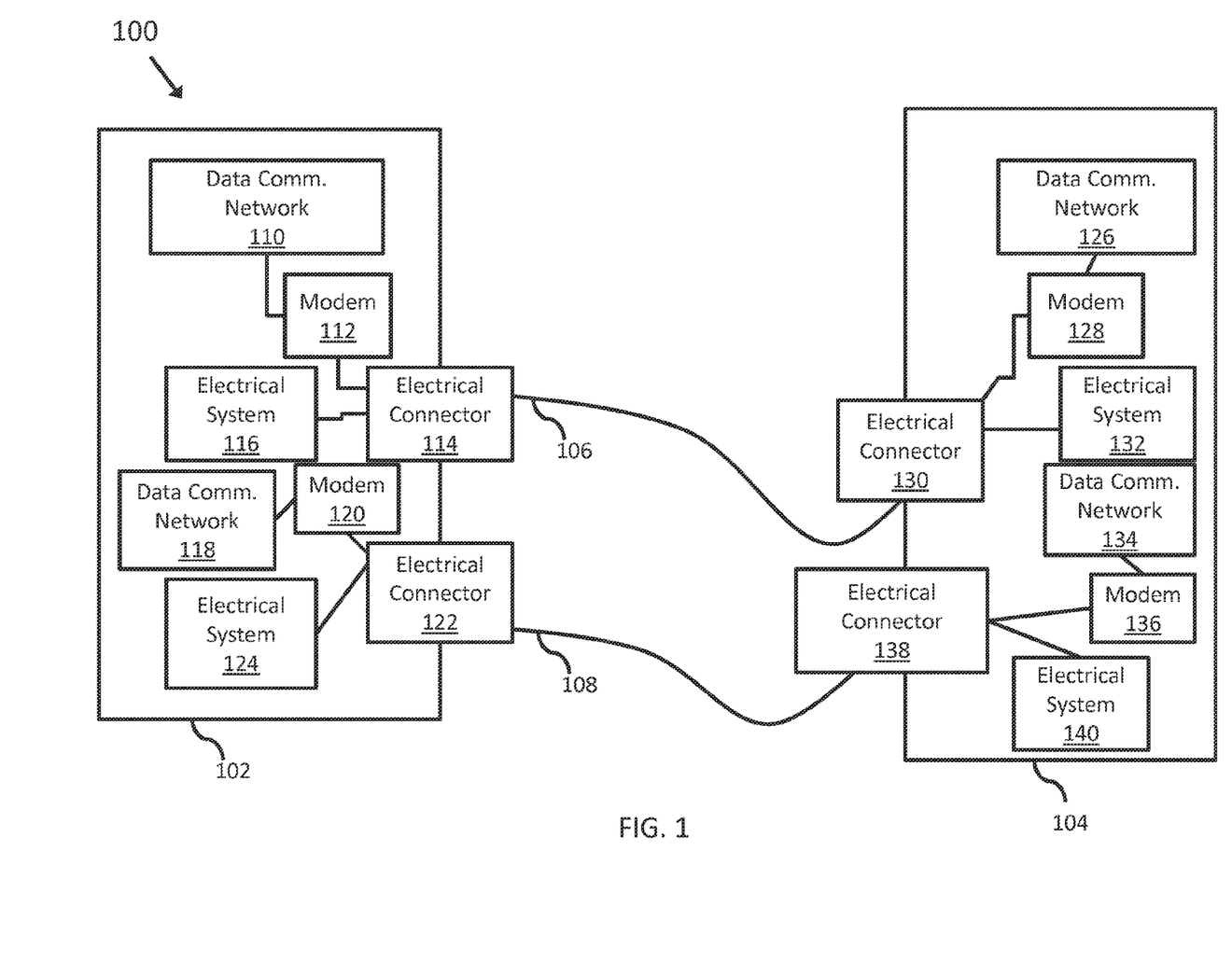
FIG. 1 is a schematic diagram of a system for use in transmitting and receiving data between a ground station and an aircraft over power cables.

FIG. 1 is a schematic diagram of a system 100 for use in transmitting and receiving data between a ground station 102 and an aircraft 104 over a first power cable 106 and a second power cable 108. In one implementation, first power cable 106 and second power cable 108 each transmit power from ground station 102 to aircraft 104. In some implementations, the power transmitted from ground station 102 to aircraft 104 has a frequency of approximately 400 Hz. In some implementations, the power is three-phase, alternating current (AC) power. Ground station 102 includes a first data communication network 110. First data communication network 110 is coupled to a first modem 112 that is coupled to a first electrical connector 114. First electrical connector 114 is coupled to first power cable 106. A first electrical system 116 of ground station 102 is also coupled to first electrical connector 114. First modem 112 is configured to transmit and receive data between first data communications network 110 and first electrical connector 114. Accordingly, data transmitted by first modem 112 to first electrical connector 114 is transmitted via first power cable 106 to aircraft 104. Likewise, data received by first modem 112 from first electrical connector 114 is received from aircraft 104 via first power cable 106.

Also included in ground station 102 is a second data communication network 118. Second data communication network 118 is coupled to a second modem 120 that is coupled to a second electrical connector 122. A second electrical system 124 of ground station 102 is also coupled to second electrical connector 122. Second modem 120 is configured to transmit and receive data between second data communications network 118 and second electrical connector 122. Accordingly, data transmitted by second modem 120 to second electrical connector 122 is transmitted via second power cable 108 to aircraft 104. Likewise, data received by second modem 120 from second electrical connector 122 is received from aircraft 104 via second power cable 108.

Aircraft 104 includes a first data communication network 126. First data communication network 126 is coupled to a first modem 128 that is coupled to a first electrical connector 130. First electrical connector 130 is coupled to first power cable 106. A first electrical system 132 of aircraft 104 is also coupled to first electrical connector 130. First modem 128 is configured to transmit and receive data between first data communications network 126 and first electrical connector 130. Accordingly, data transmitted by first modem 128 to first electrical connector 130 is transmitted via first power cable 106 to ground station 102. Likewise, data received by first modem 128 from first electrical connector 130 is received from ground station 102 via first power cable 106.

Also included in aircraft 104 is a second data communication network 134. Second data communication network 134 is coupled to a second modem 136 that is coupled to a second electrical connector 138. A second electrical system 140 of aircraft 104 is also coupled to second electrical connector 138. Second modem 136 is configured to transmit and receive data between second data communications network 134 and second electrical connector 138. Accordingly, data transmitted by second modem 136 to second electrical connector 138 is transmitted via second power cable 108 to ground station 102. Likewise, data received by second modem 136 from second electrical connector 138 is received from ground station 102 via second power cable 108. In some implementations, electrical connectors 114, 122, 130, and 138 are STINGER connectors (STINGER is a trademark of AAMP OF FLORIDA, INC.). Data transmitted over power cables 106 and 108 is transmitted in accordance with a power line communication specification, for example broadband over power line (BPL). When transmitting data, modems 112, 120, 128, and 136 convert data from a first protocol used for transmission of data over power cables 106 and 108 to a second protocol used for transmission of data in data communication networks 110, 118, 126, and 134.

In some implementations, data transmitted by modems 112 and 128 across power cable 106 pertain to a first information domain, while data transmitted by modems 120 and 136 across power cable 108 pertain to a second information domain that is different from the first information domain. The first information domain may be, for example, civilian data and the second information domain may be, for example, military data. In other implementations, the first information domain may be one of in-flight entertainment (IFE), aircraft information services (AIS), and aircraft control domain (ACD), while the second information may be another of IFE, AIS, and ACD. In some implementations, components of ground station 102 that are coupled to power cable 106 are, in general, physically separated from components of ground station 102 that are coupled to power cable 108. Likewise, components of aircraft 104 that are coupled to power cable 106 are, in general, physically separated from components of aircraft 104 that are coupled to power cable 108. The physical separation described above facilitates secure and efficient transmission of data pertaining to the first domain and data pertaining to the second domain. More specifically, the physical separation facilitates preventing data pertaining to the first information domain from being received by components that are associated with the second information domain, and vice versa.

Figure 2:
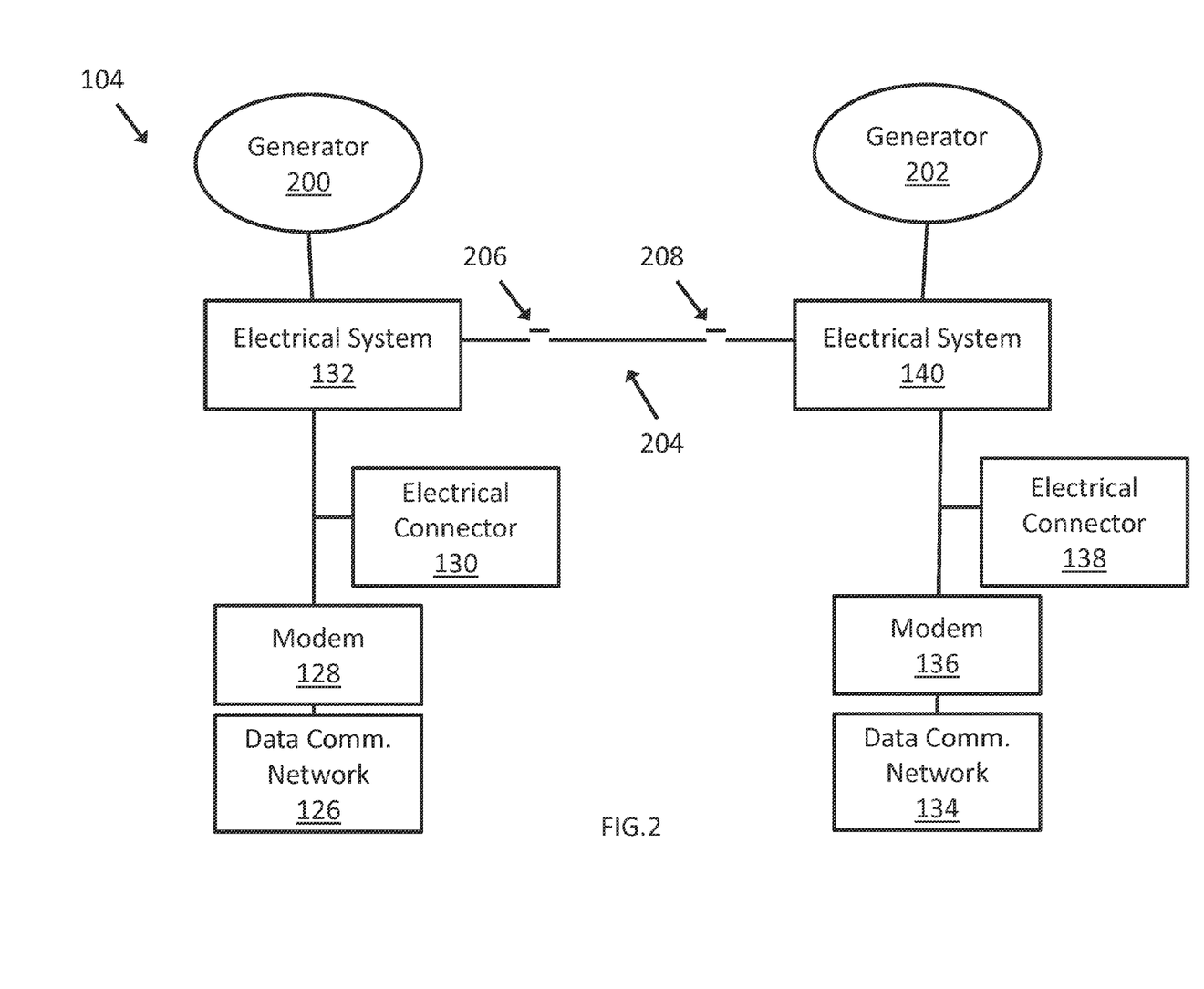
FIG. 2 is a schematic diagram of electrical and data communication components of the aircraft of FIG. 1.
Figure 3:
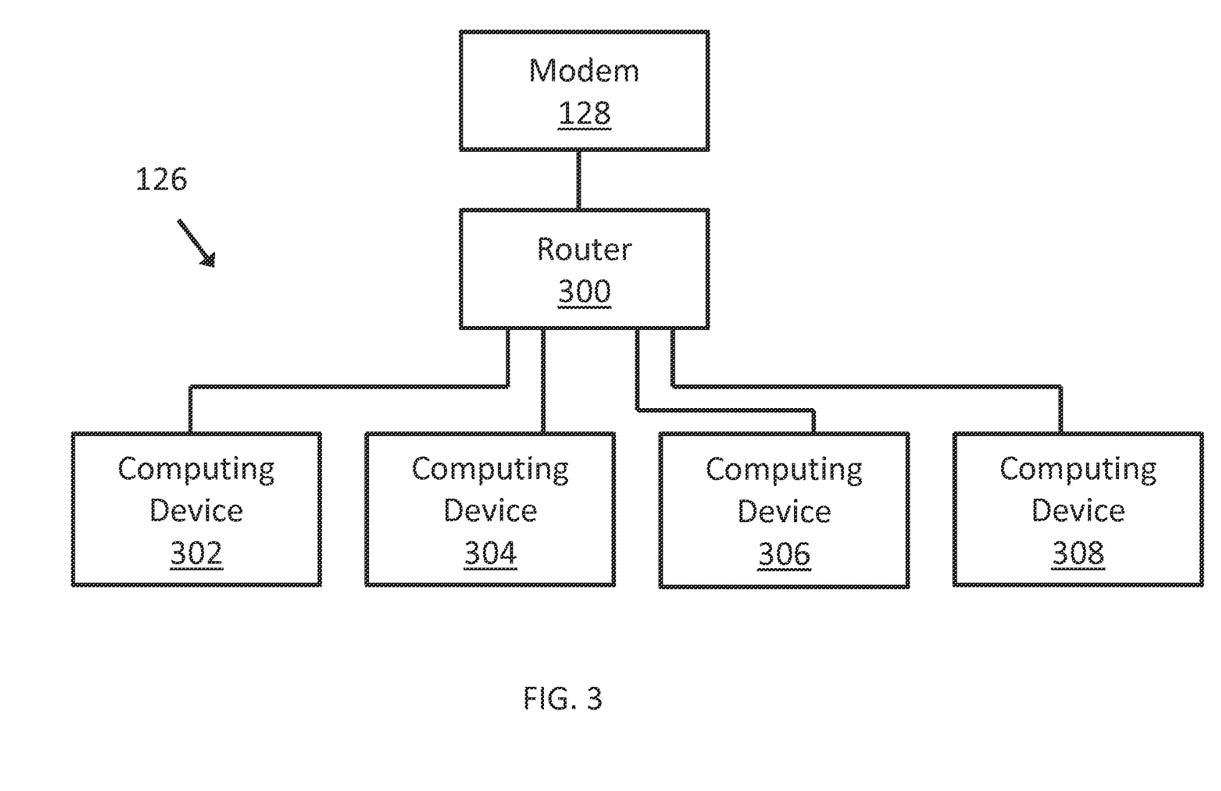
FIG. 3 is a schematic diagram of a network of FIG. 1.

FIG. 2 is a schematic diagram of electrical and data communication components of aircraft 104 of FIG. 1. Aircraft 104 includes first data communication network 126, which is coupled to first modem 128, as described above. First modem 128 is coupled to first electrical connector 130, also as described above. First electrical system 132 is also coupled to first electrical connector 130. First electrical system 132 provides electricity to various devices, such as lights (not shown) and computing devices 302 (FIG. 3). In some implementations, electricity provided by electrical system 132 has a voltage of approximately 115 volts and has an alternating current (AC). A generator 200 is also coupled to first electrical system 132. In one implementation, generator 200 generates 120 kilovolt-amps (KVA) of electrical power.

Aircraft 104 additionally includes second data communication network 134, which is coupled to second modem 136, as described above. Second modem 136 is coupled to second electrical connector 138, also as described above. Second electrical system 140 is also coupled to second electrical connector 138. Second electrical system 140 provides electricity to various devices, such as lights and computing devices. In some implementations, electricity provided by electrical system 140 has a voltage of approximately 115 volts and has an alternating current (AC). A generator 202 is also coupled to second electrical system 140. In one implementation, generator 200 generates 120 kilovolt-amps (KVA) of electrical power.

First electrical system 132 and second electrical system 140 may be selectively coupled to each other by a bus 204. Bus 204 includes a first switch 206 and a second switch 208. If either of switch 206 and switch 208 is opened, first electrical system 132 is decoupled (i.e. isolated) from second electrical system 140. If both switches 206 and 208 are closed, first electrical system 132 is coupled to second electrical system 140. In some implementations, ground station 102 is similarly configured.

FIG. 3 is a schematic diagram of first data communication network 126 of FIG. 1. A router 300 is coupled to each of a first computing device 302, a second computing device 304, a third computing device 306, and a fourth computing device 308. The number of computing devices 302, 304, 306, and 308 in data communications network 126 may vary in other implementations. Router 300 is also coupled to first modem 128. As described above, first data communication network 126, which is coupled to first power cable 106 transmits and receives data pertaining to the first information domain. Data communication network 110 of ground station 102 is similarly configured, except that it is coupled to modem 112. Likewise, data communication networks 118 and 134 are similarly configured, except that they are coupled to modems 120 and 136, respectively, and transmit and receive data pertaining to the second information domain rather than the first information domain.

Figure 4:
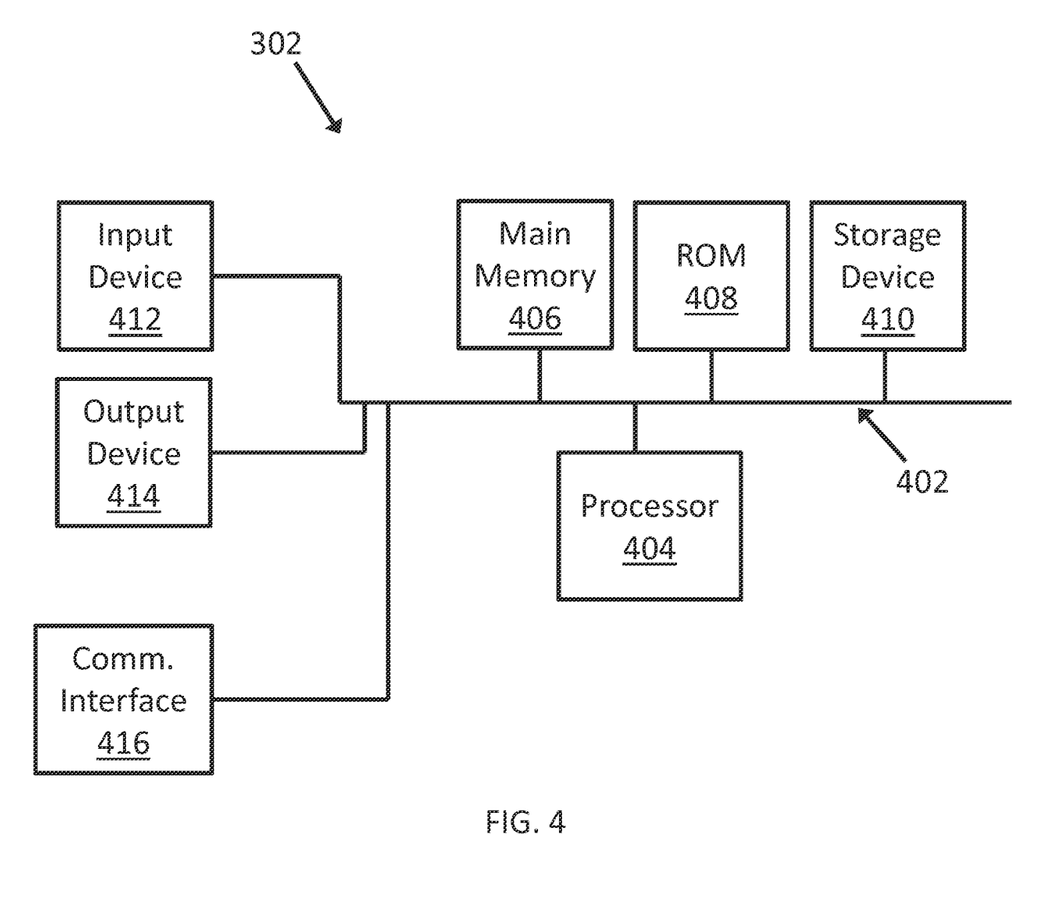
FIG. 4 is a schematic diagram of a computing device that is included in the network of FIG. 3.

FIG. 4 is a schematic diagram of computing device 302 (FIG. 3). Computing devices 304, 306, and 308 are similarly configured. Computing device 302 may include a bus 402, a processor 404, a main memory 406, a read only memory (ROM) 408, a storage device 410, an input device 412, an output device 414, and a communication interface 416. Bus 402 may include a path that permits communication among the components of computing device 302.

Processor 404 may include any type of conventional processor, microprocessor, or processing logic that interprets and executes instructions. Main memory 406 may include a random access memory (RAM) or another type of dynamic storage device that stores information and instructions for execution by processor 404. ROM 408 may include a conventional ROM device or another type of static storage device that stores static information and instructions for use by processor 404. Storage device 410 may include a magnetic and/or optical recording medium and its corresponding drive.

Input device 412 may include a conventional mechanism that permits computing device 302 to receive commands, instructions, or other inputs from a user, including visual, audio, touch, button presses, stylus taps, etc. Additionally, input device may receive location information. Accordingly, input device 412 may include, for example, a camera, a microphone, one or more buttons, a touch screen, and/or a GPS receiver. Output device 414 may include a conventional mechanism that outputs information to the user, including a display (including a touch screen) and/or a speaker. Communication interface 416 may include any transceiver-like mechanism that enables computing device 302 to communicate with other devices and/or systems. For example, communication interface 416 may include mechanisms for communicating with another device, such as router 300, computing devices 304, 306, and 308, and/or other devices (not shown).

As described herein, computing device 302 facilitates processing of data pertaining to a particular information domain, such as civilian data, military data, in-flight entertainment (IFE), aircraft information services (AIS), and aircraft control domain (ACD). Computing device 302 may perform these and other operations in response to processor 404 executing software instructions contained in a computer-readable medium, such as memory 406. A computer-readable medium may be defined as a physical or logical memory device and/or carrier wave. The software instructions may be read into memory 406 from another computer-readable medium, such as data storage device 410, or from another device via communication interface 416. The software instructions contained in memory 406 may cause processor 404 to perform processes described herein. In other implementations, hardwired circuitry may be used in place of or in combination with software instructions to implement processes consistent with the subject matter herein. Thus, implementations consistent with the principles of the subject matter disclosed herein are not limited to any specific combination of hardware circuitry and software.

Figure 5:
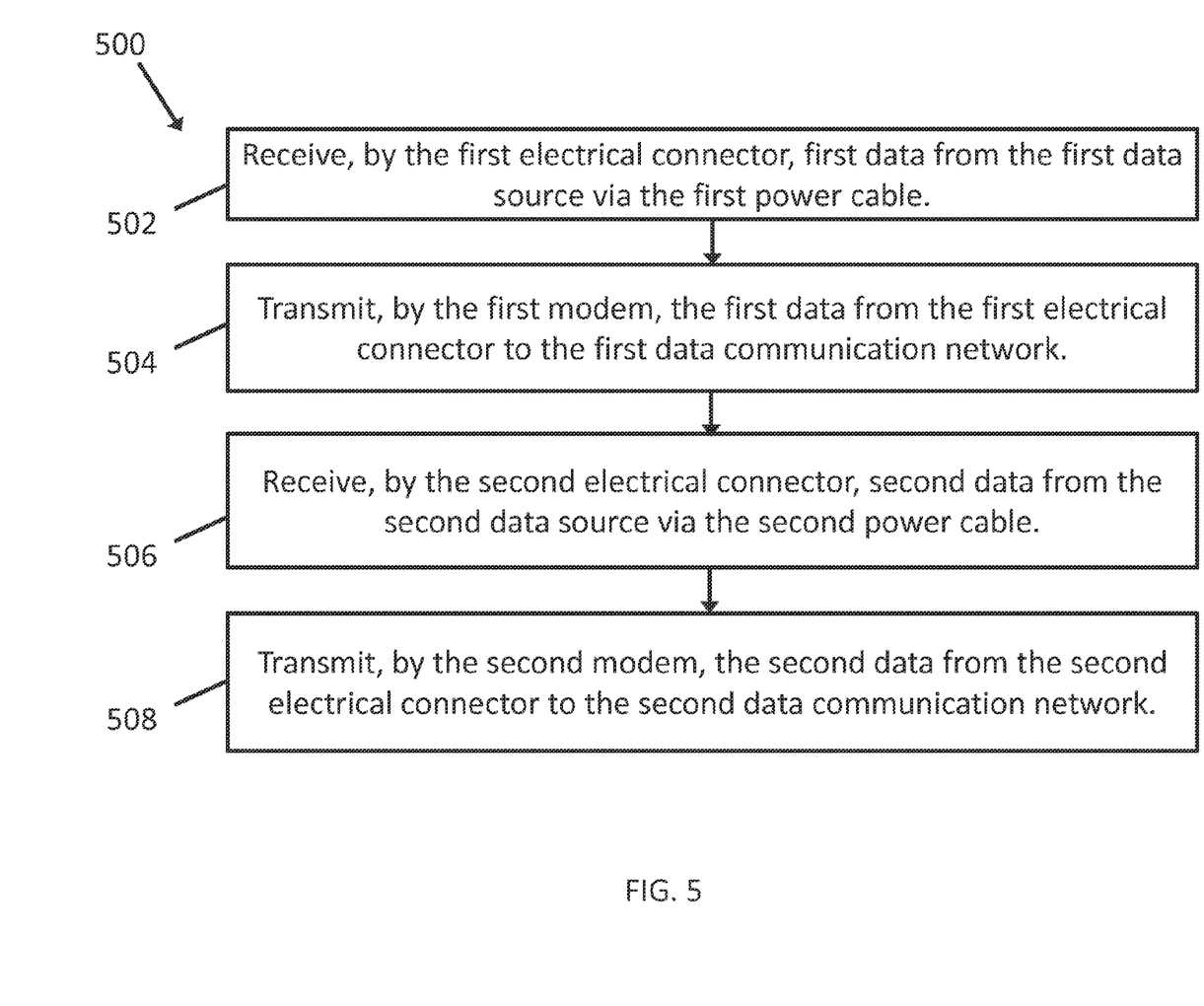
FIG. 5 is a flow diagram of a method for transmitting and receiving data between the aircraft of FIG. 1 and a first data source and a second data source that are external to the aircraft.

FIG. 5 is a flow diagram of a method 500 for transmitting and receiving data between the aircraft 104 and a first data source and a second data source that are external to aircraft 104. In some implementations, the first data source and the second data source are first data communication network 110 and second data communication network 118 of ground station 102. Initially, first electrical connector 130 receives 502 first data from the first data source (e.g., first data communication network 110) via first power cable 106. The first data is data that pertains to the first information domain, as described above. Next, first modem 128 transmits 504 the first data from first electrical connector 130 to first data communication network 126. Next, second electrical connector 138 receives 506 second data from the second data source (e.g., second data communication network 118) via second power cable 108. Next, second modem 136 transmits 508 the second data from second electrical connector 138 to second data communications network 134. The second data is data that pertains to the second information domain, as described above.

A technical effect of systems and methods described herein includes at least one of: (a) receiving, by a first electrical connector, first data from a first data source via a first power cable; (b) transmitting, by a first modem, the first data from the first electrical connector to a first data communication network; (c) receiving, by a second electrical connector, second data from a second data source via a second power cable; and (d) transmitting, by a second modem, the second data from the second electrical connector to a second data communication network.

As compared to known methods and systems for transmitting data between a ground station and an aircraft, the methods and systems described herein may provide more efficient and secure transmission and reception of the data such that data pertaining to a first information domain is not received by components that pertain to a second information domain, and vice versa.

The methods and systems described herein are not limited to the specific implementations described herein, but rather, components of the systems and/or steps of the methods may be utilized independently and separately from other components and/or steps described herein.

The description of the different advantageous implementations has been presented for purposes of illustration and description, and is not intended to be exhaustive or limited to the implementations in the form disclosed. Many modifications and variations will be apparent to those of ordinary skill in the art. Further, different advantageous implementations may provide different advantages as compared to other advantageous implementations. The implementation or implementations selected are chosen and described in order to best explain the principles of the implementations, the practical application, and to enable others of ordinary skill in the art to understand the disclosure for various implementations with various modifications as are suited to the particular use contemplated. This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An aircraft comprising:
   a first electrical connector configured to couple with a first power cable;
   a first data communication network;
   a first modem coupled to said first electrical connector and to said first data communication network, said first modem is configured to transmit data pertaining to a first information domain received at said first electrical connector through the first power cable to said first data communication network and to transmit data pertaining to the first information domain from said first data communication network to the first power cable through said first electrical connector;
   a second electrical connector configured to couple with a second power cable;
   a second data communication network;

a second modem coupled to said second electrical connector and to said second data communication network, said second modem is configured to transmit data pertaining to a second information domain received at said second electrical connector through the second power cable to said second data communication network and to transmit data pertaining to the second information domain from said second data communication network to the second power cable through said second electrical connector, wherein the second information domain is different from the first information domain.

2. The aircraft of claim 1, further comprising:
a first electrical system; and
a second electrical system,
wherein said first electrical connector is coupled to said first electrical system and wherein said second electrical connector is coupled to said second electrical system.

3. The aircraft of claim 1, wherein each of said first electrical connector and said second electrical connector are configured to receive power that has a frequency of about 400 Hz.

4. The aircraft of claim 1, wherein:
said first data communication network comprises at least a first computing device configured to at least one of transmit and receive data pertaining to the first information domain; and
said second data communication network comprises at least a second computing device configured to at least one of transmit and receive data pertaining to the second information domain.

5. The aircraft of claim 2, further comprising a switch coupled between said first electrical system and said second electrical system, such that when said switch is in an open state, said first electrical system is electrically decoupled from said second electrical system and when said switch is in a closed state, said first electrical system is electrically coupled to said second electrical system.

6. The aircraft of claim 4, wherein:
said first computing device is configured to transmit and receive data pertaining to one of in-flight entertainment, aircraft information services, and aircraft control domain; and
said second computing device is configured to transmit and receive data pertaining to another of in-flight entertainment, aircraft information services, and aircraft control domain.

7. The aircraft of claim 4, wherein:
said first computing device is configured to transmit and receive data pertaining to one of military data and civilian data; and
said second computing device is configured to transmit and receive data pertaining to the other of military data and civilian data.

8. A system for transmitting and receiving data between a ground station and an aircraft, said system comprising:
a first power cable;
a ground station comprising:
a first ground station electrical connector coupled to said first power cable;
a first ground station data communication network; and
a first ground station modem coupled to said first ground station electrical connector and to said first ground station data communication network,
wherein said first ground station modem is configured to transmit and receive data between said first ground station electrical connector and said first ground station data communication network;
an aircraft comprising:
a first aircraft electrical connector coupled to said first power cable;
a first aircraft data communication network; and
a first aircraft modem coupled to said first aircraft electrical connector and to said first aircraft data communication network,
wherein said first aircraft modem is configured to transmit and receive data between said first aircraft electrical connector and said first aircraft data communication network.

9. The system of claim 8, wherein said first power cable transmits power that has a frequency of about 400 Hz from said ground station to said aircraft.

10. The system of claim 8, further comprising:
a second power cable;
wherein said ground station further comprises:
a second ground station electrical connector coupled to said second power cable;
a second ground station data communication network; and
a second ground station modem coupled to said second ground station electrical connector and to said second ground station data communication network,
wherein said second ground station modem is configured to transmit and receive data between said second ground station electrical connector and said second ground station data communication network; and
wherein said aircraft further comprises:
a second aircraft electrical connector configured to couple with said second power cable;
a second aircraft data communication network; and
a second aircraft modem coupled to said second aircraft electrical connector and to said second aircraft data communication network,
wherein said second aircraft modem is configured to transmit and receive data between said second aircraft electrical connector and said second aircraft data communication network.

11. The system of claim 10, wherein said aircraft further comprises:
a first aircraft electrical system; and
a second aircraft electrical system,
wherein said first aircraft electrical connector is coupled to said first aircraft electrical system and wherein said second aircraft electrical connector is coupled to said second aircraft electrical system.

12. The system of claim 10, wherein:
said first aircraft data communication network comprises at least a first computing device configured to at least one of transmit and receive data pertaining to a first information domain; and
said second aircraft data communication network comprises at least a second computing device configured to at least one of transmit and receive data pertaining to a second information domain that is different from the first information domain.

13. The system of claim 11, wherein said aircraft further comprises a switch coupled between said first electrical system and said second electrical system, such that when said switch is in an open state, said first aircraft electrical system is electrically decoupled from said second aircraft electrical system and when said switch is in a closed state, said first aircraft electrical system is electrically coupled to said second aircraft electrical system.

14. The system of claim 12, wherein:
   said first aircraft computing device is configured to transmit and receive data pertaining to one of in-flight entertainment, aircraft information services, and aircraft control domain; and
   said second aircraft computing device is configured to transmit and receive data pertaining to another of in-flight entertainment, aircraft information services, and aircraft control domain.

15. A method for transmitting and receiving data between an aircraft and a first data source and a second data source that are external to the aircraft, wherein the aircraft includes:
   a first electrical connector coupled with a first power cable;
   a first data communication network;
   a first modem coupled to the first electrical connector and to the first data communication network;
   a second electrical connector coupled with a second power cable;
   a second data communication network; and
   a second modem coupled to the second electrical connector and to the second data communication network,
   said method comprising:
   receiving, by the first electrical connector, first data from the first data source via the first power cable;
   transmitting, by the first modem, the first data from the first electrical connector to the first data communication network, wherein the first data pertains to a first information domain;
   receiving, by the second electrical connector, second data from the second data source via the second power cable; and
   transmitting, by the second modem, the second data from the second electrical connector to the second data communication network, wherein the second data pertains to a second information domain that is different from the first information domain.

16. The method of claim 15, further comprising:
   transmitting, by the first modem, third data from the first data communication network to the first electrical connector;
   transmitting, by the first electrical connector, the third data to the first data source via the first power cable.

17. The method of claim 16, further comprising:
   transmitting, by the second modem, fourth data from the second data communication network to the second electrical connector; and
   transmitting, by the second electrical connector, the fourth data to the second data source via the second power cable.

18. The method of claim 15, wherein:
   said receiving first data comprises receiving first data pertaining to the first information domain that is one of in-flight entertainment, aircraft information services, and aircraft control domain; and
   said receiving second data comprises receiving second data pertaining to the second information domain that is another of in-flight entertainment, aircraft information services, and aircraft control domain.

19. The method of claim 15, wherein:
   said receiving first data comprises receiving first data pertaining to the first information domain that is one of military data and civilian data; and
   said receiving second data comprises receiving second data pertaining to the second information domain that is the other of military data and civilian data.

* * * * *